United States Patent [19]

Sawyer, Jr.

[11] 4,318,732

[45] Mar. 9, 1982

[54] METHODS OF IMPROVING THE VISCOSITY BUILDING PROPERTIES OF COLLOIDAL CLAYS

[75] Inventor: Edgar W. Sawyer, Jr., Hagerstown, Md.

[73] Assignee: International Telephone and Telegraph Corporation, New York, N.Y.

[21] Appl. No.: 118,358

[22] Filed: Feb. 4, 1980

Related U.S. Application Data

[63] Continuation of Ser. No. 908,329, May 22, 1978, abandoned.

[51] Int. Cl.$^3$ .......................... C09K 7/04; C05G 3/00
[52] U.S. Cl. .................................. 71/64.8; 252/8.5 B; 252/317
[58] Field of Search ............ 252/8.5 B, 8.5 A, 8.5 R, 252/317; 71/64 C, 64.8

[56] References Cited

U.S. PATENT DOCUMENTS

| | | | |
|---|---|---|---|
| 3,148,970 | 9/1964 | Smith et al. | 252/8.5 X |
| 3,185,642 | 5/1965 | Sawyer et al. | 252/8.5 |
| 3,872,018 | 3/1975 | Alexander | 252/8.5 |

*Primary Examiner*—Herbert B. Guynn
*Attorney, Agent, or Firm*—John T. O'Halloran; Peter C. Van Der Sluys

[57] ABSTRACT

Unslaked lime, calcium oxide (CaO) or calcium magnesium oxide, CaO.MgO is post added to a ground, colloidal clay product to obtain a resultant product which exhibits greater stability and yield factors than currently available products. The resultant product exhibits a more uniform viscosity-imparting characteristic to a solution to which it is added, while providing greater stability and hence, longer shelf life.

2 Claims, No Drawings

METHODS OF IMPROVING THE VISCOSITY BUILDING PROPERTIES OF COLLOIDAL CLAYS

This is a continuation, of application Ser. No. 908,329, filed May 22, 1978, now abandoned.

BACKGROUND OF THE INVENTION

This invention relates to colloidal clays in general and more particularly to a method of increasing the viscosity of such clays.

There are many clays which are found in nature. Basically, clay is a very fine grained, unconsolidated rock material which normally is plastic when wet, but becomes hard and stony when dry. Ordinary clay consists of hydrous silicates of aluminum, together with a large variety of impurities. Geologically, clay can be defined as a rock or mineral fragment, having a diameter less than 1/256 millimeter (0.00016″). This is about the upper limit of size of a particle that can exhibit colloidal properties.

Clays are widely used in the manufacture of tile, porcelain, as is well known and they are further used as filtering aids in oil and in other industrial processes. Clays are also used in drilling operations and are added to water, for example, to thicken the water or water solutions for these purposes and for other purposes as well. Particularly, colloidal clays are highly desirable in many industrial uses and the necessity of providing a colloidal clay is well known in the industry.

Colloidal attapulgite is mined in nothern Florida and southern Georgia and can be processed to give a colloidal grade of clay which is used to thicken water or water solutions for various industrial purposes. There are many techniques described and known in the prior art which operate to convert mined clay to its colloidal form. Certain examples of such techniques can be found by referring to U.S. Pat. No. 3,951,850 entitled "Conversion of Clay to its Colloidal Form by Hydrodynamic Attrition" issued on Apr. 20, 1976.

Essentially, attapulgite and sepiolite are unique in performance among the clay mineral thickeners. The uniqueness resides in the fact that in addition to the ability of these clays to thicken fesh water, they can also be used to thicken water solutions of salts that contain high concentrations of ionic materials.

Clays such as Wyoming bentonite are widely used gelling clays but have disadvantages. These clays will not swell and develop viscosity in the presence of flocculating cations or in low to medium ionic concentrations. For this reason attapulgite and sepiolite clays are often employed as thickening agents for saturated salt water drilling fluids. These fluids contain sodium and chloride ions. The clays can also be employed as thickeners in gypsum inhibited drilling fluids which contain calcium and sulphate ions as well as in suspension fertilizers that contain ions such as ammonium, phosphate, potassium, chloride, nitrate and sulfate. Essentially, these clays can be employed with substances or solutions having ionic types or concentrations that would interfere with the employment and use of the ordinary types of gelling grades of clay such as Wyoming bentonite, hectorite and so on.

Colloidal grades of attapulgite exhibit a considerable degree of variation in their viscosity-imparting characteristics. These variations are indicated by the amount of viscosity a given percentage of clay produces in any solution and how much stirring is necessary to produce the viscosity. In the oil well drilling industry these factors are commonly referred to as the yield in barrels of 15 centipoise mud per ton of clay (B/T) and rate of viscosity yield of the clay respectively. See API "Standard Procedure for Testing Drilling Fluids", API RP 93B 3rd Edition, February 1971 and API "Specification for Oil-Well Drilling-Fluid Materials", API Spec. 13A, Sixth Edition, January 1974. Many theoretical reasons have been offered to account for the above description variations but none have been proven.

It is established practice to improve the rate of yield and sometimes the yield of the clay by subjecting the clay to extrusion during the processing operations. Certain of the crude clays exhibit improvements in yield and rate of yield when additives such as magnesium hydroxide, $Mg(OH)_{29}$ or hydrated MgO are pugged into them prior to extrusion. In spite of this, very few crude clays exhibit a yield improvement when the above noted additives are post added to a finished product.

The post addition of chemical hydrate lime, $Ca(OH)_2$, results in a considerable improvement in yield and a minor improvement in rate of yield. Colloidal clays treated with $Ca(OH)_2$ are inherently unstable because of the possible air carbonation of the hydrated lime and the reaction of the hydrated lime with the clay. For the abovementioned reasons, lime additions followed by pugging and extrusion degrade the yield of the clay and when hydrated lime is post added, a uniform, intimately intermixture produced by grinding also drops yields. The recommended method of addition is to add the hydrated lime as discrete, easily discernible particles. This technique results in a very poor mixture. Furthermore, to avoid carbonation during storage, the finished, hydrated lime-treated product must be packaged in plasticlined bags.

The above outline represents the current state of manufacturing practice. It should be noted that in spite of the deficiencies of hydrated lime treatment, it is by far the most economical yield improvement method because of the much higher costs of pugging in hydrated MgO plus extrusion practices. In short, the most economically attractive treatment for yield improvement has to be the post addition of an inexpensive chemical additive.

It is therefore an object of the invention to provide a chemical additive which when post added to a colloidal clay substantially increases the yield factors, while further providing improved stability. The additive which is preferably unslaked lime, can be added rapidly and economically.

BRIEF DESCRIPTION OF PREFERRED EMBODIMENT

A process for producing a colloidal clay product particularly adapted for use in thickening of liquid solutions which comprises initially post adding a predetermined percentage of calcium oxide to a ground clay of a colloidal grade.

DETAILED DESCRIPTION OF INVENTION

The invention consists of the discovery and use of such an additive which can be post added to a ground clay product, producing high yield products with acceptable stability and economy. The additive is ground, unslaked lime, CaO or CaO.MgO. Unslaked lime is less expensive than hydrated lime, $Ca(OH)_2$. Furthermore, products treated with unslaked lime exhibit better stability and higher yields. The high yield values are stable enough to allow the use of paper bags with no plastic liner for shipment and storage. Examples of the yield and stability results achieved by the use of CaO and CaO.MgO are shown in Tables I and II included herein.

The samples in Tables I and II were prepared by dry blending the unslaked lime and chemical hydrate at the concentrations shown into two clays. Samples were stored in paper bags and evaluated initially and after storage for one year.

This compounding and testing was repeated using a second clay sample. Formulations and results are shown in Table II.

To test the specimens, a goal of a final yield of 130 B/T minimum after a storage period of one year in paper bags and a yield degradation of 0.33%/T/Week was specified as indicative of a desirable product. Using these criteria, treatment with C.P. CaO results in a good product at all levels (Table I) as does Baker lime, a soft-burnt dolomitic lime from J. E. Baker Co., at 0.50% and 1.0% treatment levels (Table I). The same clay treated with chemical hydrate fails. The results on the set of samples prepared from the second clay (Table II) indicate that treatment with 1% Corson lime, a soft-burnt dolomitic lime from Corson Co., almost qualifies while treatment with 0.5% and 1.0% Glass House Lime, a high-calcium lime from U.S. Gypsum Co., qualify. Treatments with chemical hydrate did not qualify.

Levels of lime treatment covered are 0.25 to 2.0% with the preferred range being 1.0 to 1.5%. Limes covered are soft burnt CaO and soft burnt dolomitic limes (approximately CaO.MgO) with the high calcium unslaked limes being preferred.

Other clays which can be employed according to the teachings of this invention are sepiolites and other palygorskites (if differentiated from attapulgite).

It is believed that the enhanced yield and stability results of the CaO and CaO.MgO- treated samples when compared to the results exhibited by the Ca(OH)$_2$- treated samples is due to the different reactivities of the unslaked limes and Ca(OH)$_2$. Ca(OH)$_2$, hydrated lime, can react directly with $CO_2$ and with the clay. Unslaked lime, cannot react directly with the $CO_2$ or the clay but does react directly with water or water vapor. The resultant veneer or sheel of Ca(OH)$_2$ formed can be carbonated but appears to form a coating that protects the CaO substrate, thus retarding further reaction and loss of CaO. The protected kernel of unreacted CaO is available as a source of hydroxyl (OH)$^-$ and $Ca^{++}$ ions to disperse and refloculate the clay when it is stirred into fresh or ion-contaminated water.

TABLE I

EVALUATION OF UNSLAKED LIMES AS YIELD-IMPROVING AGENTS

| | | LIME | | Yields* in Sat. Salt Water | | Yield Change (B/T) | |
| --- | --- | --- | --- | --- | --- | --- | --- |
| TEST | CLAY | TYPE | % | Initial B/T | After 1 yr. B/T | Total | Per Week |
| 1 | A | Control | 0 | 113 | 107 | −6 | −0.12 |
| 2 | A | C.P. CaO | 0.25 | 137 | 134 | −3 | −0.06 |
| 3 | A | C.P. CaO | 0.50 | 155 | 155 | 0 | 0 |
| 4 | A | C.P. CaO | 1.0 | 162 | 179 | +17 | +0.33 |
| 5 | A | Baker Lime** | 0.25 | 130 | 121 | −9 | −0.17 |
| 6 | A | Baker Lime | 0.50 | 153 | 136 | −17 | −0.33 |
| 7 | A | Baker Lime | 1.0 | 177 | 159 | −18 | −0.35 |
| 8 | A | Chemical Hydrate*** | 0.25 | 128 | 114 | −14 | −0.50 |
| 9 | A | Chemical Hydrate | 0.50 | 141 | 111 | −30 | −0.58 |
| 10 | A | Chemical Hydrate | 1.0 | 167 | 131 | −36 | −0.69 |

*API Yield
**Dolomitic lime from J.E. Baker Co. (soft burnt).
***Mississippi Lime chemical hydrate, Ca(OH)$_2$
B/T = Barrels of 15 centipoise mud per ton of clay
Clay A is attapulgite clay in colloidal form.
See API "Standard Procedure for Testing Drilling Fluids", API RP 93B 3rd Edition, Feb. 1971 and API "Specification for Oil-Well Drilling-Fluid Materials", API Spec. 13A, Sixth Edition, Jan. 1974.

TABLE II

CONDUCTED WITH AN ATTAPULGITE CLAY IN COLLOIDAL FORM

| | LIME | | Sat. Salt Water Yields | | Yield Change (B/T) | |
| --- | --- | --- | --- | --- | --- | --- |
| TEST | TYPE | % | Initial B/T | After Times Shown B/T | Total | Per Week |
| 1 | Control | 0 | 125 | 84 (38 weeks) | −41 | −1.08 |
| 2 | Corson Lime | 0.25 | 134 | 73 (38 weeks) | −61 | −1.61 |
| 3 | Corson Lime | 0.50 | 140 | 103 (38 weeks) | −37 | −0.97 |
| 4 | Corson Lime | 1.0 | 156 | 134 (52 weeks) | −22 | −0.42 |
| 5 | USG Glass House Lime | 0.25 | 137 | 107 (36 weeks) | −30 | −0.83 |
| 6 | USG Glass House Lime | 0.50 | 145 | 130 (52 weeks) | −17 | −0.33 |
| 7 | USG Glass House Lime | 1.0 | 157 | 147 (52 weeks) | −10 | −0.19 |
| 8 | Chemical Hydrate | 0.25 | 134 | 107 (28 weeks) | −27 | −0.96 |
| 9 | Chemical Hydrate | 0.50 | 142 | 120 (52 weeks) | −22 | −0.42 |
| 10 | Chemical Hydrate | 1.0 | 156 | 128 (52 weeks) | −28 | −0.54 |

What is claimed is:

1. A process for producing a high yield, stable colloidal clay product particularly adapted for use in thickening of liquid solutions used in drilling fluids and suspension fertilizers, which consists solely of post adding a predetermined percentage of unslaked lime to a dry, particulate ground clay of a colloidal grade, wherein said predetermined percentage is between 0.25 to 2.0% of the weight of said clay, with said unslaked lime selected from the group consisting of soft burnt calcium oxide and glass house lime with said ground clay selected from the group consisting of attapulgite, sepiolite palygorskite, said colloidal clay product having a yield of 130 B/T minimum after a storage period of one year in paper bags, where B/T equals barrels of 15 centipose mud per ton of clay while exhibiting a yield degradation of no greater than 0.33 B/T per week, to enable said product to be stored and shipped in paper bags without plastic liners.

2. An admixture adapted for use in thickening of liquid solutions consisting of a dry, ground, particulate colloidal clay selected from the group consisting of attapulgite, sepiolite and palygorskite and a post added unslaked lime consisting selected from the group consisting of soft burnt calcium oxide and glass house lime in an amount within the range of 0.25 to 2.0% based on the weight of said colloidal clay to provide an admixture exhibiting a yield of 130 B/T minimum after a storage period of one year in paper bags where B/T equals barrels of 15 centipose mud per ton of clay with a yield degradation of no greater than 0.33 B/T per week, to enable the admixture to be stored and shipped in paper bags without plastic liners.

* * * * *

UNITED STATES PATENT AND TRADEMARK OFFICE
CERTIFICATE OF CORRECTION

PATENT NO. : 4,318,732
DATED : March 9, 1982
INVENTOR(S) : Edgar W. Sawyer, Jr.

It is certified that error appears in the above—identified patent and that said Letters Patent is hereby corrected as shown below:

At column 2, line 16, after "hydroxide," correction should be made as follows:

$$Mg(OH)_2, \text{ or}$$

At column 3, line 16, after "degradation of" correction should be made as follows:

$$0.33B/T/Week$$

Signed and Sealed this

Eighteenth Day of May 1982

[SEAL]

Attest:

Attesting Officer

GERALD J. MOSSINGHOFF
Commissioner of Patents and Trademarks